United States Patent
Wynants et al.

(10) Patent No.: US 7,625,440 B2
(45) Date of Patent: Dec. 1, 2009

(54) STABLE NON-AQUEOUS INKJET INKS

(75) Inventors: Sonny Wynants, Langdorp (BE); Ivan Hoogmartens, Wilrijk (BE)

(73) Assignee: Agfa Graphics NV, Mortsel (BE)

( * ) Notice: Subject to any disclaimer, the term of this patent is extended or adjusted under 35 U.S.C. 154(b) by 0 days.

(21) Appl. No.: 12/299,313

(22) PCT Filed: Apr. 17, 2007

(86) PCT No.: PCT/EP2007/053729

§ 371 (c)(1),
(2), (4) Date: Nov. 3, 2008

(87) PCT Pub. No.: WO2007/134921

PCT Pub. Date: Nov. 29, 2007

(65) Prior Publication Data

US 2009/0090271 A1 Apr. 9, 2009

Related U.S. Application Data

(60) Provisional application No. 60/809,756, filed on May 31, 2006.

(30) Foreign Application Priority Data

May 19, 2006 (EP) ................................. 06114221

(51) Int. Cl.
*C09D 11/02* (2006.01)
(52) U.S. Cl. ................................. 106/31.86; 106/31.78
(58) Field of Classification Search .............. 106/31.86, 106/31.78
See application file for complete search history.

(56) References Cited

U.S. PATENT DOCUMENTS

| | | | |
|---|---|---|---|
| 4,395,287 A | 7/1983 | Kobayashi et al. | |
| 4,461,647 A | 7/1984 | Schofield et al. | |
| 4,610,554 A * | 9/1986 | Suzuki et al. | 106/31.43 |
| 5,594,044 A * | 1/1997 | Yang | 106/31.58 |
| 6,627,364 B2 * | 9/2003 | Kiguchi et al. | 430/7 |
| 7,014,698 B2 * | 3/2006 | Mizutani et al. | 106/31.86 |
| 7,125,447 B2 * | 10/2006 | Sugita et al. | 106/31.86 |
| 7,156,909 B2 * | 1/2007 | Oyanagi et al. | 106/31.86 |
| 7,559,984 B2 * | 7/2009 | Deroover | 106/31.78 |
| 7,585,364 B2 * | 9/2009 | Deroover | 106/497 |
| 2002/0043179 A1 | 4/2002 | Norimatsu et al. | |
| 2003/0073759 A1 | 4/2003 | Koga et al. | |
| 2004/0122130 A1 | 6/2004 | Chang et al. | |
| 2007/0248838 A1 | 10/2007 | De Saint-Romain | |
| 2008/0295734 A1 * | 12/2008 | Deroover | 106/31.77 |
| 2008/0305261 A1 * | 12/2008 | Deroover et al. | 427/256 |
| 2008/0308005 A1 * | 12/2008 | Deroover | 106/31.78 |
| 2009/0025604 A1 * | 1/2009 | Deroover et al. | 106/31.78 |
| 2009/0038505 A1 * | 2/2009 | Deroover | 106/31.8 |

FOREIGN PATENT DOCUMENTS

| | | |
|---|---|---|
| EP | 0 763 378 A2 | 3/1997 |
| EP | 0 805 192 A2 | 11/1997 |
| EP | 1 114 850 A1 | 7/2001 |
| EP | 1 528 086 A1 | 5/2005 |
| WO | 2005/007761 A1 | 1/2005 |

OTHER PUBLICATIONS

Official Communication issued in International Patent Application No. PCT/EP2007/053729, mailed on Jul. 5, 2007.
Hoogmartens; "Stable Non-Aqueous Inkjet Inks"; U.S. Appl. No. 12/299,312; filed Nov. 3, 2008.
Hoogmartens; "Stable Non-Aqueous Inkjet Inks"; U.S. Appl. No. 12/299,315; filed Nov. 3, 2008.

* cited by examiner

*Primary Examiner*—Helene Klemanski
(74) *Attorney, Agent, or Firm*—Keating & Bennett, LLP

(57) ABSTRACT

A non-aqueous inkjet ink include a pigment and a mixture of at least two polyalkyleneglycol dialkylethers represented by Formula (I):

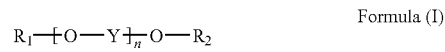

Formula (I)

wherein,
$R_1$ and $R_2$ are each independently selected from an alkyl group having 1 to 4 carbon atoms;
Y represents an ethylene group or a propylene group; wherein n is an integer selected from 4 to 20 for a first polyalkyleneglycol dialkylether; and n is an integer selected from 5 to 20 for a second polyalkyleneglycol dialkylether. A method for preparing a non-aqueous inkjet ink is also provided.

17 Claims, No Drawings

STABLE NON-AQUEOUS INKJET INKS

CROSS-REFERENCE TO RELATED APPLICATIONS

This application is a 371 National Stage Application of PCT/EP2007/053729, filed Apr. 17, 2007. This application claims the benefit of U.S. Provisional Application No. 60/809,756, filed May 31, 2006, which is incorporated by reference herein in its entirety. In addition, this application claims the benefit of European Application No. 06114221.2, filed May 19, 2006, which is also incorporated by reference herein in its entirety.

BACKGROUND OF THE INVENTION

1. Field of the Invention

The present invention relates to non-aqueous inkjet inks improved for dispersion stability and suitable for use in manufacturing decorative laminates by single pass inkjet printing.

2. Description of the Related Art

Pigment dispersions are usually made using a dispersant. A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the dispersing energy required. Dispersed pigment particles may have a tendency to re-agglomerate after the dispersing operation due to mutual attraction forces. The use of dispersants also counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of the pigment particles through the nozzles of the print head, which are usually 10 to 50 micrometers in diameter. In addition, pigment particle agglomeration and the associated blockage of the printer nozzles has to be avoided during the standby periods of the printer.

Polymeric dispersants generally contain in one part of the molecule so-called anchor groups, which adsorb onto the pigments to be dispersed, and in a spatially separate part of the molecule, the polymeric dispersants have polymer chains compatible with the dispersion medium, thus stabilizing the pigment particles in the dispersion medium. Typical polymeric dispersants include graft copolymer and block copolymer dispersants.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is much more difficult for non-aqueous inkjet inks, such as solvent based, oil based and radiation curable inkjet inks. The pigments are especially difficult to disperse when they have a non-polar surface.

These dispersing problems have lead to the design of very specific polymeric dispersants wherein the anchor groups are pigment derivatives. For example, EP 0763378 A (TOYO INK) discloses a pigment composition including a non-aqueous type pigment dispersing agent having a portion which has a high affinity with a pigment and which has at least one type selected from the group consisting of an organic dye, anthraquinone and acridone only at a terminal end or at both terminal ends of at least one polymer selected from a linear urethane polymer and a linear acrylic polymer, and a pigment.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. It is suggested that the synergist should possess the pigment structure substituted by one or more sulfonic acid groups or ammonium salts thereof.

U.S. Pat. No. 4,461,647 (ICI) discloses a dispersion of a pigment in an organic liquid containing a water-insoluble asymmetric disazo compound including a central divalent group free from acidic and other ionic substituents linked through azo groups to two monovalent end groups characterized in that one end group, the first, is free from acidic and other ionic substituents and the other end group, the second, carries a single substituted ammonium-acid salt group.

Although these dispersion synergists work fine for some pigments, many other pigments cannot be dispersed to an acceptable quality in a non-aqueous medium. This is, for example, the case for diketopyrrolo-pyrrole pigments, for which it is difficult to obtain stable non-aqueous pigment dispersions, especially stable non-aqueous inkjet inks.

U.S. 2004/0122130 (CHANG ET AL.) discloses a photo-curable pigment type inkjet ink composition containing Pigment Red 254, but the ink requires the presence of water and a reactive surfactant.

The dispersion quality and stability can also be influenced by the composition of the dispersion medium, however this also influences the behavior of inkjet droplets jetted upon the ink-receiver surface.

Many types of solvents and specific combinations of solvents have been disclosed. EP 1528086 A (SEIKO EPSON) discloses an oil-based inkjet ink including at least 50% of a mixed solvent of a lactone-type solvent and a polyoxyethyleneglycol dialkyl ether. It was discovered by the present inventor that further improvements in dispersion stability and jetting characteristics, such as latency, were required particularly for single pass inkjet printing. For certain inkjet applications, it would also be desirable to make inks lacking a noxious solvent such as lactone.

For consistent image quality, inkjet inks require high dispersion stability capable of dealing with high temperatures (above 65° C.) during transport of the ink to a customer, jetting at elevated temperatures and changes in the dispersion medium of the inkjet ink during use. Theses changes in the dispersion medium can occur, for example, by evaporation of solvent and increasing concentrations of humectants, penetrants and other additives at the nozzles during the summer or when the printer is not jetting ink for a long time (i.e., latency) and the inkjet print-heads are filled with ink, e.g., over the weekend.

Inkjet printing provides large flexibility in the production of decorative laminates, but high printing speed is required to obtain acceptable productivity. This is possible with single pass inkjet printing if the inkjet printing process is so reliable that during a print job no maintenance is required. Inkjet inks having very high dispersion quality and stability and exhibiting minimal latency problems are therefore required. Aqueous inkjet inks generally exhibit latency problems due to the relative high volatility of water. Diketopyrrolo-pyrrole pigments have been a preferred choice in non-inkjet printing inks, such as, e.g., gravure inks, to print images on a decorative paper used in the manufacturing process of decorative laminates for imitating a wooden floor. These pigments have been dispersed to acceptable dispersion quality and stability in aqueous inkjet inks but not in non-aqueous inkjet inks.

SUMMARY OF THE INVENTION

In order to overcome the problems described above, preferred embodiments of the present invention are capable of manufacturing inkjet inks exhibiting high dispersion quality and stability while exhibiting minimal latency problems.

Another preferred embodiment of the present invention provides an inkjet ink set for producing decorative laminates with a warm wooden color appearance.

Further advantages and benefits achieved by preferred embodiments of the present invention will become apparent from the description hereinafter.

Surprisingly, it has been discovered that a reliable non-aqueous single pass inkjet printing step could be integrated into the manufacturing process of decorative laminates capable of delivering decorative laminates with a warm wooden color when non-aqueous pigmented inkjet inks including a specific mixture of polyalkyleneglycol dialkylethers were used.

According to a preferred embodiment of the present invention, a non-aqueous inkjet ink includes a pigment and a mixture of at least two polyalkyleneglycol dialkylethers represented by Formula (I):

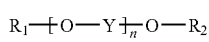

Formula (I)

wherein, $R_1$ and $R_2$ are each independently selected from an alkyl group having 1 to 4 carbon atoms;

Y represents an ethylene group or a propylene group; wherein n is an integer selected from 4 to 20 for a first polyalkyleneglycol dialkylether; and n is an integer selected from 5 to 20 for a second polyalkyleneglycol.

According to another preferred embodiment of the present invention, a method for preparing a non-aqueous inkjet ink includes the steps of:

a) preparing a pigment dispersion by mixing a pigment and a solvent mixture including at least two polyalkyleneglycol dialkylethers represented by Formula (I):

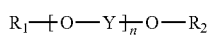

Formula (I)

wherein, $R_1$ and $R_2$ are each independently selected from an alkyl group having 1 to 4 carbon atoms;

Y represents an ethylene group or a propylene group;

n is an integer selected from 4 to 20;

n is a different integer for the at least two polyalkyleneglycol dialkylethers; and b) diluting the pigment dispersion of step a) with a non-aqueous solvent to obtain a pigment concentration between 0.1 and 20 wt % based upon the total weight of the inkjet ink.

The non-aqueous inkjet inks exhibit excellent latency so that no capping of the print heads is required.

It was discovered that not only the diketopyrrolo-pyrrole pigments could be dispersed to an excellent quality and stability, but also a wide range of other pigments could be dispersed in non-aqueous inkjet inks exhibiting high dispersion quality and stability.

The non-aqueous inkjet inks did not require the presence of a surfactant for printing images of high quality on decorative base paper.

These and other elements, characteristics, features, steps and advantages of the present invention will become more apparent and described in more detail in the following detailed description of preferred embodiments thereof.

DETAILED DESCRIPTION OF THE PREFERRED EMBODIMENTS

Definitions

The term "colorant", as used in the preferred embodiments of the present invention means dyes and pigments.

The term "dye", as used in the preferred embodiments of the present invention means a colorant having a solubility of 10 mg/L or more in the medium in which it is applied and under the ambient conditions pertaining thereto.

The term "pigment" is defined in DIN 55943, herein incorporated by reference, as a coloring agent that is practically insoluble in the application medium under the pertaining ambient conditions, hence having a solubility of less than 10 mg/L therein.

The term "C.I." is used in the preferred embodiments of the present application as an abbreviation for Colour Index.

The term "alkyl" means all variants possible for each number of carbon atoms in the alkyl group i.e., for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

Non-Aqueous Inkjet Inks

A non-aqueous inkjet ink according to a preferred embodiment of the present invention includes a pigment and a mixture of at least two polyalkyleneglycol dialkylethers represented by Formula (I):

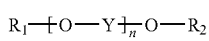

Formula (I)

wherein, $R_1$ and $R_2$ are each independently selected from an alkyl group having 1 to 4 carbon atoms;

Y represents an ethylene group or a propylene group; wherein n is an integer selected from 4 to 20 for a first polyalkyleneglycol dialkylether; and n is an integer selected from 5 to 20 for a second polyalkyleneglycol.

In another preferred embodiment, the non-aqueous inkjet ink includes a third polyalkyleneglycol dialkylether according to Formula (I) having the integer n selected from 4 to 20, more preferably the integer n is selected from 6 to 20.

The alkyl groups $R_1$ and $R_2$ of the polyalkyleneglycol dialkylethers according to Formula (I) preferably represent methyl and/or ethyl. Most preferably, the alkyl groups $R_1$ and $R_2$ are both methyl groups.

In a preferred embodiment, the polyalkyleneglycol dialkylethers of the non-aqueous inkjet ink are polyethyleneglycol dialkylethers.

In another preferred embodiment, the mixture of polyalkyleneglycol dialkylethers represented by Formula (I) includes at least one polyalkyleneglycol dialkyl ether wherein the integer n is equal to 6.

Suitable mixtures of polyalkyleneglycol dialkylethers for the pigment dispersions according to a preferred embodiment of the present invention include mixtures of polyethylene glycol dimethyl ethers having a molecular weight of at least 200, such as Polyglycol DME 200™, Polyglycol DME 250™ and Polyglycol DME 500™ from CLARIANT. The polyalkyleneglycol dialkylethers used in the non-aqueous inkjet ink preferably have an average molecular weight between 200 and 800, and more preferably no polyalkyleneglycol dialkylethers with a molecular weight of more than 800 are present. The mixture of polyalkyleneglycol dialkylethers is preferably a homogeneous liquid mixture at room temperature.

In another preferred embodiment, a mixture of four or more polyalkyleneglycol dialkylethers, more preferably polyethyleglycol dialkylethers are present in the non-aqueous inkjet ink.

A non-aqueous inkjet ink is generally prepared in a two step process by first dispersing pigment and dispersant in one or more 'dispersion solvents' to obtain a concentrated pigment dispersion and then diluting the pigment dispersion with one or more 'ink solvents" and other components to obtain the desired viscosity, surface tension, color, hue, saturation density, and print area coverage for a particular application.

In a preferred embodiment, the dispersion solvents may be other organic solvents than the mixture of polyalkyleneglycol dialkylethers, which are then included as the ink solvents.

In a preferred embodiment, the dispersion solvents include the mixture of polyalkyleneglycol dialkylethers according to a preferred embodiment of the present invention and the one or more organic solvents used as ink solvents can be other organic solvents but may include polyalkyleneglycol dialkylethers.

Most preferably, a method for preparing a non-aqueous inkjet ink is used including the steps of:

a) preparing a pigment dispersion by mixing a pigment and a mixture of at least two polyalkyleneglycol dialkylethers represented by Formula (I):

Formula (I)

wherein,

R$_1$ and R$_2$ are each independently selected from an alkyl group having 1 to 4 carbon atoms;

Y represents an ethylene group or a propylene group;

n is an integer selected from 4 to 20;

n is a different integer for said at least two polyalkyleneglycol dialkylethers; and b) diluting the pigment dispersion of step a) with a non-aqueous solvent to obtain a pigment concentration between 0.1 and 20 wt % based upon the total weight of the inkjet ink.

The mixture of polyalkyleneglycol dialkylethers is preferably present in the non-aqueous inkjet ink in a concentration of between 4 wt % and 98 wt %, more preferably between 15 wt % and 95 wt % and most preferably between 25 wt % and 90 wt % all based upon the total weight of the non-aqueous inkjet ink.

The non-aqueous inkjet ink according to a preferred embodiment of the present invention may further contain at least one surfactant.

The non-aqueous inkjet ink according to a preferred embodiment of the present invention may contain at least one humectant to prevent the clogging of the nozzle due to its ability to slow down the evaporation rate of ink.

The non-aqueous inkjet ink according to a preferred embodiment of the present invention is preferably an organic solvent based but may also be a curable pigmented inkjet ink. The curable pigmented inkjet ink is preferably radiation curable. The viscosity of the pigmented inkjet ink is preferably lower than 100 mPa·s at 30° C. The viscosity of the pigmented inkjet ink is preferably lower than 30 mPa·s, more preferably lower than 15 mPa·s, and most preferably between 2 and 10 mPa·s all measured at a shear rate of 100 s$^{-1}$ and a jetting temperature between 10 and 70° C.

The curable pigmented inkjet ink may contain as the dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable pigmented inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

For producing color images, the non-aqueous inkjet inks are used in an inkjet ink set. Preferably, the inkjet ink set includes at least two non-aqueous inkjet inks according to a preferred embodiment of the present invention. In a preferred embodiment, the inkjet ink set includes at least a cyan ink, a magenta ink, a yellow ink and a black ink. The CMYK ink set may also be extended with extra inks such as red, green, blue, and/or orange to enlarge the color gamut of the image. The CMYK ink set may also be extended by the combination of full density and light density inks of both color inks and/or black inks to improve the image quality by lowered graininess.

In a preferred embodiment, the inkjet ink set includes a non-aqueous inkjet ink having C.I. Pigment Red 254 as a pigment.

Preparation of Pigment Dispersions

The non-aqueous inkjet ink according to a preferred embodiment of the present invention may be prepared by milling the pigment in the dispersion medium, preferably in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium oxide beads.

In the process of mixing, milling and dispersion, each process is performed with cooling to prevent the build up of heat, and for radiation curable inkjet inks as much as possible under light conditions in which actinic radiation has been substantially excluded.

The non-aqueous inkjet ink according to a preferred embodiment of the present invention may contain more than one pigment, the non-aqueous inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical devices and residence conditions, the initial and desired final particle size, etc. In a preferred embodiment of the present invention, pigment dispersions with an average particle size of less than 150 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general, it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, color, hue, saturation density, and print area coverage for the particular application.

In preparing the inkjet ink, it is preferred that one or more degassing steps are performed at one time or another for removing air or gas bubbles from the ink. Degassing is preferably performed by heating and/or reduced pressure. The degassing step(s) can be performed on the concentrated pigment dispersion and/or on the final inkjet ink composition.

Pigments

The pigments used in the non-aqueous inkjet ink according to a preferred embodiment of the present invention may be black, white, cyan, magenta, yellow, red, orange, violet, blue, green, brown, mixtures thereof, and the like.

The color pigment may be chosen from those disclosed by HERBST, Willy, et al., Industrial Organic Pigments, Production, Properties, Applications, 3rd Edition, Wiley-VCH, 2004, ISBN 3527305769.

Particularly preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213.

Particularly preferred pigments are C.I. Pigment Yellow 120, 151, 154, 175, 180, 181 and 194.

The most preferred yellow pigments are C.I. Pigment Yellow 120, 139, 150 and 155.

Particularly preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270 and 272. For manufacturing decorative laminates, the most preferred are C.I. Pigment Red 254 and C.I. Pigment Red 266. For other non-aqueous inkjet applications the most preferred pigments are C.I. Pigment Red 122 and C.I. Pigment Violet 19.

Particularly preferred pigments are C.I. Pigment Violet 1, 2, 19, 23, 32, 37 and 39.

Particularly preferred pigments are C.I. Pigment Blue 15:1, 15:2, 15:3, 15:4, 15:6, 16, 56, 61 and (bridged) aluminium phthalocyanine pigments.

Particularly preferred pigments are C.I. Pigment Orange 5, 13, 16, 34, 40, 43, 59, 66, 67, 69, 71 and 73.

Particularly preferred pigments are C.I. Pigment Green 7 and 36.

Particularly preferred pigments are C.I. Pigment Brown 6 and 7.

Suitable pigments include mixed crystals of the above particularly preferred pigments. A commercially available example is Cinquasia Magenta RT-355-D from Ciba Specialty Chemicals.

Carbon black is preferred as a pigment for the non-aqueous black inkjet ink because it always exhibits a warm brownish black tone.

Suitable black pigment materials include carbon blacks such as Pigment Black 7 (e.g., Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. Additional examples of suitable pigments are disclosed in U.S. Pat. No. 5,389,133 (XEROX).

It is also possible to make mixtures of pigments in one pigment dispersion or non-aqueous inkjet ink. For other applications than manufacturing decorative laminates, a neutral black inkjet ink is generally preferred and can be obtained, for example, by mixing a black pigment and a cyan pigment into the ink. The inkjet application may also require one or more spot colors, for example for packaging inkjet printing or textile inkjet printing. Silver and gold are often desired colors for inkjet poster printing and point-of-sales displays.

Also, non-organic pigments can be advantageously dispersed according to a preferred embodiment of the present invention. Particularly preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black.

Generally, pigments are stabilized in the dispersion medium by dispersing agents, such as polymeric dispersants or surfactants. However, the surface of the pigments can be modified to obtain so-called "self-dispersible" or "self-dispersing" pigments, i.e., pigments that are dispersible in the dispersion medium without dispersants.

Pigment particles in non-aqueous inkjet ink should be sufficiently small to permit the free flow of the ink through the inkjet printing device, especially at the ejecting nozzles. It is also desirable to use small particles for maximum color strength and to slow down sedimentation.

The average particle size of the pigment in the pigmented inkjet ink should be between 0.005 and 15 μm. Preferably, the average pigment particle size is between 0.005 and 5 μm, more preferably between 0.005 and 1 μm, particularly preferably between 0.005 and 0.3 μm and most preferably between 0.040 and 0.150 µm. Larger pigment particle sizes may be used as long as the benefits and advantages of the preferred embodiments of the present invention are achieved.

The pigment is preferably used in the non-aqueous pigment dispersion used for preparing the inkjet ink in an amount of 10 to 40 wt %, preferably 20 to 30 wt % based on the total weight of the pigment dispersion. In the inkjet ink, the pigment is preferably used in an amount of 0.1 to 20 wt %, preferably 1 to 10 wt % based on the total weight of the inkjet ink.

Dispersants

A non-aqueous inkjet ink according to a preferred embodiment of the present invention contains at least two components: (i) a pigment, and (ii) a liquid dispersion medium. If the pigment is not a self-dispersible pigment, the non-aqueous inkjet ink preferably contains a polymeric dispersant.

Typical polymeric dispersants are copolymers of two monomers but may contain three, four, five or even more monomers. The properties of polymeric dispersants depend on both the nature of the monomers and their distribution in the polymer. Copolymeric dispersants suitable in pigment dispersions according to a preferred embodiment of the present invention may have the following polymer compositions:

- randomly polymerized monomers (e.g., monomers A and B polymerized into ABBAABAB);
- alternating polymerized monomers (e.g., monomers A and B polymerized into ABABABAB);
- gradient (tapered) polymerized monomers (e.g., monomers A and B polymerized into AAABAABBABBB);
- block copolymers (e.g., monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with side chains attached to the backbone); and
- mixed forms of these polymers, e.g., blocky gradient copolymers.

Polymeric dispersants suitable in pigment dispersions according to a preferred embodiment of the present invention may have different polymer architectures including linear, comb/branched, star, dendritic (including dendrimers and hyperbranched polymers). A general review on the architecture of polymers is given by ODIAN, George, Principles Of Polymerization, 4th Edition, Wiley-Interscience, 2004, pp. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Polymeric dispersants suitable in pigment dispersions according to a preferred embodiment of the present invention may be prepared via addition or condensation type polymerizations. Polymerization methods include those described by ODIAN, George, Principles of Polymerization, 4th Edition, Wiley-Interscience, 2004, pp. 39-606.

Addition polymerization methods suitable for preparing polymeric dispersants for use in pigment dispersions according to a preferred embodiment of the present invention include free radical polymerization (FRP) and controlled polymerization techniques. Suitable controlled radical polymerization methods include:

RAFT: reversible addition-fragmentation chain transfer;
ATRP: atom transfer radical polymerization
MADIX: reversible addition-fragmentation chain transfer process, using a transfer active xanthate;
Catalytic chain transfer (e.g., using cobalt complexes);
Nitroxide (e.g., TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN, J. F. et al., Facile Synthesis of Comb, Star, and Graft Polymers via Reversible Addition-fragmentation Chain Transfer (RAFT) Polymerization, Journal of Polymer Science, Part A: Polymer Chemistry, Vol. 40, pp. 2956-2966, 2002.

Group transfer polymerization (GTP): the method of GTP used for synthesis of AB block copolymers is disclosed by SPINELLI, Harry J., GTP and its Use in Water Based Pigment Dispersants and Emulsion Stabilisers, Proc. of 20th Int. Conf. Org. Coat. Sci. Technol., New Platz, N.Y., State Univ. N.Y., Inst. Mater. Sci., pp. 511-518.

The synthesis of dendritic polymers is described in the literature. The synthesis of dendrimers in NEWCOME, G. R. et al., Dendritic Molecules: Concepts, Synthesis, Perspectives, VCH: WEINHEIM, 2001. Hyperbranching polymerization is described by BURCHARD, W., Solution Properties of Branched Macromolecules, *Advances in Polymer Science*, 1999, Vol. 143, No. II, pp. 113-194. Hyperbranched materials can be obtained by polyfunctional polycondensation as disclosed by FLORY, P. J., Molecular Size Distribution in Three-dimensional Polymers. VI. Branched Polymer Containing A-R-Bf-1-type Units, *Journal of the American Chemical Society*, 1952, Vol. 74, pp. 2718-2723.

Living cationic polymerizations is, e.g., used for the synthesis of polyvinyl ethers as disclosed WO 2005/012444 (CANON) and U.S. 2005/0197424 (CANON). Anionic co-ordination ring-opening polymerization is, e.g., used for the synthesis of polyesters based on lactones. Living anionic ring-opening polymerization is, e.g., used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HEWLETT-PACKARD COMPANY), U.S. Pat. No. 5,302,197 (DU PONT) and U.S. Pat. No. 6,528,557 (XEROX CORPORATION).

Suitable random copolymeric dispersants are disclosed in U.S. Pat. No. 5,648,405 (DU PONT), U.S. Pat. No. 6,245,832 (FUJI XEROX), U.S. Pat. No. 6,262,207 (3M INNOVATIVE PROPERTIES COMPANY), U.S. 2005/0004262 (KAO CORPORATION) and U.S. Pat. No. 6,852,777 B1 (KAO CORPORATION).

Suitable alternating copolymeric dispersants are described in U.S. 2003/0017271 (AKZO NOBEL N.V.).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT) and U.S. 2004/0102541 (LEXMARK).

Suitable branched copolymeric dispersants are described in U.S. Pat. No. 6,005,023 (DU PONT), U.S. Pat. No. 6,031,019 (KAO CORPORATION), and U.S. Pat. No. 6,127,453 (EASTMAN KODAK).

Suitable dendritic copolymeric dispersants are described in, e.g., U.S. Pat. No. 6,518,370 (3M INNOVATIVE PROPERTIES COMPANY), U.S. Pat. No. 6,258,896 (3M INNOVATIVE PROPERTIES COMPANY), WO 2000/063305 (GEM GRAVURE CORPORATION), U.S. Pat. No. 6,649,138 (QUANTUM DOT CORPORATION), U.S. 2002/0256230 (BASF), EP 1351759 (EFKA ADDITIVES), and EP 1295919 (EASTMAN KODAK).

Suitable designs of polymeric dispersants for inkjet inks are disclosed in SPINELLI, Harry J., Polymeric Dispersants in Ink Jet technology, *Advanced Materials*, 1998, Vol. 10, No. 15, pp. 1215-1218.

The monomers and/or oligomers used to prepare the polymeric dispersant can be any monomer and/or oligomer found in the Polymer Handbook Vol 1+2, 4th Edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesizing polymeric dispersants include: acrylic acid, methacrylic acid, maleic acid (or there salts), maleic anhydride, alkyl(meth)acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g., oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidil ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylalcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:

Copolymers which are the product of a condensation process of poly(ethylene imine) with a carboxylic acid terminated polyester (made by addition polymerization); and Copolymers which are the product of a reaction of multifunctional isocyanate with a mono-substituted active H-containing compound like polyester, with a compound containing two active hydrogens (like a polyether) which serves as a crosslinker and the residual isocyanates being transformed to carbamates or urea with compounds containing active hydrogens and an N-containing ring.

A detailed list of suitable polymeric dispersants is disclosed by MC CUTCHEON, Functional Materials, North American Edition, Glen Rock, N.J.: Manufacturing Confectioner Publishing Co., 1990, pp. 110-129.

Suitable pigment stabilizers are also disclosed in DE (BAYER), U.S. Pat. No. 5,720,802 (XEROX), U.S. Pat. No. 5,713,993 (DU PONT), PCT/GB95/02501, U.S. Pat. No. 5,085,689 (BASF) and U.S. Pat. No. 2,303,376 (FUJITSU ISOTEC).

The pigment dispersion can contain one polymeric dispersant or a mixture of two or more polymeric dispersants to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant preferably has a polymerization degree DP between 5 and 1,000, more preferably between 10 and 500 and most preferably between 10 and 100.

The polymeric dispersant preferably has a number average molecular weight Mn between 500 and 30,000, more preferably between 1,500 and 10,000.

The polymeric dispersant preferably has an average molecular weight Mw smaller than 100,000, more preferably smaller than 50,000 and most preferably smaller than 30,000.

The polymeric dispersant preferably has a polymeric dispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred for non-aqueous inkjet inks include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigment dispersions are Solsperse™ 32000 and 39000 from NOVEON.

Particularly preferred dispersants for oil based pigment dispersions are Solsperse™ 11000, 11200, 13940, 16000, 17000 and 19000 from NOVEON.

Particularly preferred dispersants for UV-curable pigment dispersions are Solsperse™ 32000 and 39000 dispersants from NOVEON.

The polymeric dispersant is preferably used in the pigment dispersion in an amount of 2 to 600 wt %, more preferably 5 to 200 wt % based on the weight of the pigment.

Dispersion Synergists

The non-aqueous inkjet ink according to a preferred embodiment of the present invention may contain at least one dispersion synergist. A mixture of dispersion synergists may be used to further improve dispersion stability The dispersion synergist usually consists of an anionic part and a cationic part. The anionic part of the dispersion synergist exhibits a certain molecular similarity with the color pigment and the cationic part of the dispersion synergist consists of one or more protons and/or cations to compensate for the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is between 2:1 to 100:1, preferably between 2:1 and 20:1.

Suitable dispersion synergists that are commercially available include Solsperse™ 5000 and Solsperse™ 22000 from NOVEON.

A particularly preferred pigment for the magenta ink used in an inkjet ink set for manufacturing decorative laminates is a diketopyrrolo-pyrrole pigment. For obtaining excellent dispersion stability and quality, the use of a dispersion synergist was necessary in the magenta ink. Preferably, a dispersion synergist was used for a diketopyrrolo-pyrrole pigment as those disclosed in EP 1 790 698. In dispersing C.I. Pigment Blue 15, the use of a sulfonated Cu-phthalocyanine dispersion synergist, e.g., Solsperse™ 5000 from NOVEON is preferred. In a preferred embodiment, the non-aqueous magenta and cyan inkjet inks contain a different dispersion synergist.

Suitable dispersion synergists for yellow non-aqueous inkjet inks include those disclosed in EP 1 790 697.

Dispersion Media

The dispersion medium used in the pigmented inkjet ink according to a preferred embodiment of the present invention is a non-aqueous liquid. However, sometimes a small amount, generally less than 10 wt % of water based on the total weight of the dispersion medium, can be present. This water is not intentionally added but comes into the formulation via other components as a contamination, such as, for example polar organic solvents. Higher amounts of water than 10 wt % of water based on the total weight of the dispersion medium tend to make the non-aqueous inkjet inks unstable, preferably, the water content is less than 1 wt % based on the total weight dispersion medium and most preferably no water at all is present.

In a preferred embodiment, the dispersion medium consists of the mixture of at least two polyalkyleneglycol dialkylethers according to Formula (I).

In another preferred embodiment, the dispersion medium is diluted with at least one other organic solvent. Suitable organic solvents include alcohols, ketones, esters, ethers, glycols and polyglycols and derivatives thereof, lactones, N-containing solvents such as amides, saturated hydrocarbons and unsaturated hydrocarbons. Preferably, mixtures of one or more of these solvents are used.

In a preferred embodiment, the dispersion medium is diluted with a polyalkyleneglycol derivative selected from the group consisting of polyalkyleneglycol monoalkyl ether acetates and polyalkyleneglycol monoalkyl ethers.

In a more preferred embodiment, the polyalkyleneglycol monoalkyl ether acetate is selected from the group consisting of dipropyleneglycol monomethyl ether acetate and diethyleneglycol monobutyl ether acetate.

In another more preferred embodiment, the polyalkyleneglycol monoalkyl ether is selected from the group consisting of triethyleneglycol monobutyl ether and tripropyleneglycol monomethylether.

In another preferred embodiment, the non-aqueous inkjet ink has the liquid component of the ink consisting of one or more polyalkyleneglycol derivatives and the mixture of polyalkyleneglycol dialkylethers.

Examples of suitable alcohols used to dilute the dispersion medium include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmitate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers and polyalkylene glycol mono alkyl ethers and esters such as alkylene glycol mono alkyl esters, polyalkylene glycol mono alkyl esters and polyalkylene glycol dialkyl esters. Also mixed ether/ester compounds are suitable.

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propoylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, diethylene glycol diethyl ether, triethylene glycol diethyl ether, diethylene glycol methyl ethyl ether, triethylene glycol methyl ethyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Suitable commercial glycol ether solvents include Cellosolve™ solvents and Carbitol™ solvents from UNION CARBIDE, Ektasolve™ solvents from EASTMAN, Dowanol™ solvents from DOW, Oxitoll™ solvents, Dioxitoll™ solvents, Proxitoll™ solvents and Diproxitoll™ solvents from SHELL CHEMICAL and Arcosolv™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N,N-dimethylacetamid, N,N-dimethylformamid, acetonitril and N,N-dimethyldodecanamide.

Examples of suitable hydrocarbons include saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene and xylene.

In another preferred embodiment, the dispersion medium includes oil types of liquids, alone or in combination with organic solvent(s).

Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent preferably has a high boiling point, preferably above 200° C. Examples of suitable combinations are disclosed by EP 0808347 (XAAR TECHNOLOGY LTD) especially for the use of oleyl alcohol and EP 1157070 (VIDEOJET TECHNOLOGIES INC) for the combination of oil and a volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum napta oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene, xylene, napthalene, phenanthrene, anthracene and derivatives thereof. In literature the term paraffinic oil is often used. Suitable Paraffinic oils can be normal paraffin type (octane and higher alkanes), isoparaffins (isooctane and higher iso-alkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuric-acid washing or the like, as described in U.S. Pat. No. 6,730,153 (SAKATA INX CORP.). Suitable hydrocarbons are also described as de-aromatized petroleum distillates.

Suitable examples of halogenated hydrocarbons include methylene dichloride, chloroform, carbon tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialklyl polysiloxane (e.g., hexanemethyl disiloxane, tetramethyl disiloxane, octamethyl trisiloxane, hexanemethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

"White oils" is a term used for white mineral oils, which are highly refined mineral oils that consist of saturated aliphatic and alicyclic non-polar hydrocarbons. White oils are hydrophobic, colorless, tasteless, odorless, and do not change color over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the Isopar M range (isoparaffins) and Varsol/Naphtha range from EXXON CHEMICAL, the Soltrol™ range and hydrocarbons from CHEVRON PHILLIPS CHEMICAL, and the Shellsol™ range from SHELL CHEMICALS.

Suitable commercial normal paraffins include the Norpar™ range from EXXON MOBIL CHEMICAL.

Suitable commercial napthenic hydrocarbons include the Nappar™ range from EXXON MOBIL CHEMICAL.

Suitable commercial de-aromatized petroleum distillates include the Exxsol™ D types from EXXON MOBIL CHEMICAL Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include Witco™ white oils from CROMPTON CORPORATION.

If the non-aqueous inkjet ink is a curable pigment dispersion, the dispersion medium includes one or more monomers and/or oligomers to obtain a liquid dispersion medium. Preferably, the content of organic solvent is less than 20 wt % based on the total weight of the pigmented inkjet ink.

Preferred organic solvents include alcohols, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also, glycol, glycolethers, N-methylpyrrolidone, N,N-dimethylacetamid, N,N-dimethylformamid may be used.

Suitable monomers and oligomers can be found in Polymer Handbook, Vol. 1+2, 4th Edition, edited by J. BRANDRUP, et al., Wiley-Interscience, 1999.

Suitable examples of monomers for curable pigmented inkjet inks include: acrylic acid, methacrylic acid, maleic acid (or their salts), maleic anhydride; alkyl(meth)acrylates (linear, branched and cycloalkyl) such as methyl(meth)acrylate, n-butyl(meth)acrylate, tert-butyl(meth)acrylate, cyclohexyl(meth)acrylate and 2-ethylhexyl(meth)acrylate; aryl(meth) acrylates such as benzyl(meth)acrylate and phenyl(meth) acrylate; hydroxyalkyl(meth)acrylates such as hydroxyethyl (meth)acrylate and hydroxypropyl(meth)acrylate; (meth) acrylates with other types of functionalities (e.g., oxirane, amino, fluoro, polyethylene oxide, phosphate-substituted) such as glycidyl (meth)acrylate, dimethylaminoethyl(meth) acrylate, trifluoroethyl acrylate, methoxypolyethyleneglycol (meth)acrylate and tripropyleneglycol(meth)acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl (meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether; and vinylesters of carboxylic acids such as vinylacetate and vinylbutyrate.

A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used.

Binders

The non-aqueous inkjet ink compositions may include a binder resin. However, for making decorative laminates, preferably no binder is present as it would influence negatively the quality and speed of impregnation with an impregnating resin after inkjet printing.

The binder functions as a viscosity controlling agent and also provides fixability relative to a substrate, e.g., a polyvinyl chloride substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstylene copolymer resin. These binders may be used alone or in a mixture thereof. The binder is preferably a film-forming thermoplastic resin.

The amount of binder resin in the inkjet ink is preferably in the range of 0.1 to 30 wt %, more preferably 0.3 to 10 wt %, most preferably 0.5 to 5 wt % based on the total weight of the inkjet ink.

Surfactants

Decorative paper has an open surface so that it can be rapidly and uniformly impregnated with melamine-formaldehyde resins, urea-formaldehyde resins, phenol-formaldehyde resins and other impregnating resins. The non-aqueous inkjet inks according to preferred embodiments of the present invention did not require the presence of a surfactant for printing images of high quality on decorative base paper. However, if the ink receiver consists of a decorative base paper coated with an ink receiving layer, preferably the non-aqueous inkjet ink contains at least one surfactant for controlling the dot size of an ink droplet on the ink receiver.

The surfactant(s) can be anionic, cationic, non-ionic, or zwitter-ionic and are usually added in a total quantity less than 20 wt % based on the total weight of the pigmented inkjet ink and particularly in a total less than 10 wt % based on the total weight of the pigmented inkjet ink.

Suitable surfactants for the pigmented inkjet ink include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SUR-FYNOL™ 104, 104H, 440, 465 and TG available from AIR PRODUCTS & CHEMICALS INC.).

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. Other preferred humectants include cyclohexane, 2-pyrrolidone, ethylenecarbonate, propyleencarbonate and gamma-butyrolactone. The humectant is preferably added to the non-aqueous inkjet ink in an amount of 0.1 to 40 wt %, more preferably 0.1 to 10 wt %, and most preferably approximately 4.0 to 6.0 wt % each based on the total weight of the non-aqueous inkjet ink.

EXAMPLES

Materials

All materials used in the examples were readily available from standard sources such as Aldrich Chemical Co. (Belgium) and Acros (Belgium) unless otherwise specified.

PB15 is the abbreviation for C.I. Pigment Blue 15 for which Hostaperm Blue B4G-KR™ from CLARIANT was used.

PY150 is the abbreviation for C.I. Pigment Yellow 150 for which Pigment Yellow E4GN-GT from BAYER was used.

PY150B is the abbreviation for C.I. Pigment Yellow 150 for which Chromophtal Yellow™ LA2 from Ciba Specialty Chemicals was used.

PR254 is the abbreviation for C.I. Pigment Red 254 for which Irgazin™ DPP Red BTR from Ciba Specialty Chemicals was used.

PB7 is the abbreviation for C.I. Pigment Black 7 for which Special Black™ 550 from DEGUSSA was used.

SOLSPERSE™ 39000 is a hyperdispersant from NOVEON.

SOLSPERSE™ 5000 is a dispersion synergist from NOVEON.

DEGDEE is diethyleneglycol diethylether from ACROS.

PEGDME250 is a polyethyleneglycol dimethylether with an average molecular weight of 250 from CLARIANT sold under the tradename of Polyglycol DME 250.

PEGDME500 is a polyethyleneglycol dimethylether with an average molecular weight of 500 from CLARIANT sold under the tradename of Polyglycol DME 500.

DPGMMEA is dipropyleneglycol monomethyl ether acetate from DOW.

TEGMBE is triethyleneglycol monobutyl ether from WAKO CHEMICALS.

DEGMBEA is diethyleneglycol monobutylether from Eastman Kodak.

PGMPhE is propyleneglycol monophenylether from DOW.

TPGMME is tripropyleneglycol monomethylether from ALDRICH.

Measurement Methods

1. Average Particle Size

The average particle size diameter was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

2. Pigment Dispersion Stability

The pigment dispersion stability was determined by comparing the average particle size of the pigments in the dispersion or the ink with the average particle size of the pigments of the same ink subjected to a heat treatment of 7 days at 83° C. in a sealed container. The % growth based on the original average particle size was used as a parameter to evaluate the pigment dispersion stability. The smaller the % growth value, the more stable the pigment dispersion was. The % growth value should preferably be less than 40%, more preferably less than 25% and most preferably less than 10%. For preventing the clogging of the nozzles, the average particle size should also stay below 200 nm, preferably below 150 nm.

3. Viscosity

The viscosity of the inkjet inks was measured using a Brookfield DV-II+ viscometer at 25° C. and shear rate of 15 RPM.

4. Surface Tension

The surface tension of the inkjet inks was measured with a KRÜSS tensiometer K9 at 25° C. after 60 seconds.

5. Optical Density

The optical density of single color print patches was measured using a Gretag SPM50.

6. Cielab Values

Printed samples were measured with a calibrated spectrophotometer (Gretag SPM50) to determine the coordinates of the L*a*b* colors system of the color difference indication method specified in CIE (Commission International de l'Eclairage). In this case, the measurement was carried out under conditions of light source D50, provision of no light source filter, absolute white as reference white, and angle of visibility 2°.

7. Latency Time

The latency time was determined by performing a nozzle check of the inkjet ink on the Agfa: Dotrix printer at the start and after idle times. During the idle time, the print heads were at rest without any maintenance and without capping of the print heads. The latency time was the time interval up to which all nozzles performed well in the nozzle check after the idle time.

Example 1

This example illustrates that the use of a mixture of specific polyalkyleneglycol dialkylethers improves the pigment dispersion quality and stability compared to a single polyalkyleneglycol dialkylether.

Preparation and Evaluation of Inkjet Inks

All inkjet inks were prepared in the same manner to obtain a composition as described in Table 1 and Table 2, except that the concentration of the dispersion synergist and the type of solvent (the "dispersion solvent") in the milling mixture were altered. The concentration of the dispersion solvent in the milling mixture was compensated for by the function of the dispersion synergist.

A milling mixture with 15 wt % pigment and 15 wt % dispersant was prepared by adding the pigment PB15:4, the polymeric dispersant Solsperse™ 39000 and the dispersant synergist Solsperse™ 5000 to the dispersion solvent. The milling mixture was then milled during cooling by a NETZSCH™ LABSTAR1 at a 50% volume filling with yttrium-stabilized zirconium oxide-beads of 0.4 mm diameter ("high wear resistant zirconia grinding media" from TOSOH Co.) and a residence time of 45 minutes.

The inventive non-aqueous inkjet inks INV-1 to INV-7 and the comparative non-aqueous inkjet inks COMP-1 to COMP-3 were then prepared according to Table 1 and Table 2 by adding 65 parts by weight of a solvent (the "ink solvent") to 35 parts by weight of the milling mixture during stirring at room temperature.

TABLE 1

| wt % of compound: | INV-1 | COMP-1 | INV-2 | COMP-2 | INV-3 | COMP-3 |
|---|---|---|---|---|---|---|
| PB15 | 5.250 | 5.250 | 5.250 | 5.250 | 5.250 | 5.250 |
| Solsperse ™ 39000 | 5.250 | 5.250 | 5.250 | 5.250 | 5.250 | 5.250 |
| Solsperse ™ 5000 | 0.350 | 0.350 | 0.175 | 0.175 | 0.088 | 0.088 |
| Dispersion solvent | | | | | | |
| DEGDEE | 24.150 | 24.150 | 24.325 | 24.325 | 24.412 | 24.412 |
| PEGDME250 | — | — | — | — | — | — |
| Ink solvent | | | | | | |
| DEGDEE | — | 65.000 | — | 65.000 | — | 65.000 |
| PEGDME250 | 65.000 | — | 65.000 | — | 65.000 | — |

TABLE 2

| wt % of compound: | INV-4 | INV-5 | INV-6 | INV-7 |
|---|---|---|---|---|
| PB15 | 5.250 | 5.250 | 5.250 | 5.250 |
| Solsperse ™ 39000 | 5.250 | 5.250 | 5.250 | 5.250 |
| Solsperse ™ 5000 | 0.175 | 0.175 | 0.088 | 0.088 |
| Dispersion solvent | | | | |
| DEGDEE | — | — | — | — |
| PEGDME250 | 24.325 | 24.325 | 24.412 | 24.412 |
| Ink solvent | | | | |
| DEGDEE | — | 65.000 | — | 65.000 |
| PEGDME250 | 65.000 | — | 65.000 | — |

The dispersion stability was evaluated by comparing the average particle size measured after preparation of the ink and the average particle size measured in the ink after a heat treatment of 7 days at 83° C. The results are given in Table 3.

TABLE 3

| Non-aqueous inkjet ink | Average particle size | | |
|---|---|---|---|
| | after ink preparation | after 7 days at 83° C. | % growth |
| INV-1 | 126 nm | 142 nm | 12% |
| COMP-1 | 120 nm | 142 nm | 17% |
| INV-2 | 125 nm | 157 nm | 24% |
| COMP-2 | 126 nm | 167 nm | 28% |

TABLE 3-continued

| Non-aqueous inkjet ink | Average particle size | | |
|---|---|---|---|
| | after ink preparation | after 7 days at 83° C. | % growth |
| INV-3 | 137 nm | 169 nm | 20% |
| COMP-3 | 147 nm | 193 nm | 31% |
| INV-4 | 109 nm | 104 nm | 0% |
| INV-5 | 107 nm | 104 nm | 0% |
| INV-6 | 109 nm | 109 nm | 0% |
| INV-7 | 104 nm | 102 nm | 0% |

From Table 3, it should be clear that the use of a mixture of polyethyleneglycol dimethylethers (PEGDME250) instead of a single diethyleneglycol diethylether (DEGDEE) delivered more stable non-aqueous inkjet inks. The inventive inkjet inks INV-4 to INV-7 show that the use of PEGDME250 as a dispersion solvent resulted in inkjet inks of superior quality and stability.

Example 2

This example illustrates that a mixture of specific polyalkyleneglycol dialkylethers as a dispersion solvent in the milling mixture allows a wider choice of ink solvents than when a single polyalkyleneglycol dialkylether is used for the dispersion solvent.

Preparation and Evaluation of Inkjet Inks

All inkjet inks were prepared in the same manner to obtain a composition as described in Table 4 and Table 5, except that the concentration of the dispersion synergist and the type of solvent (the "dispersion solvent") in the milling mixture were altered.

A milling mixture with 15 wt % pigment and 15 wt % dispersant was prepared by adding the pigment PY150 and the polymeric dispersant Solsperse™ 39000 to the dispersion solvent. The milling mixture was then milled during cooling by a NETZSCH™ LABSTAR1 at a 50% volume filling with yttrium-stabilized zirconium oxide-beads of 0.4 mm diameter ("high wear resistant zirconia grinding media" from TOSOH Co.) and a residence time of 45 minutes.

The inventive non-aqueous inkjet inks INV-8 to INV-13 and the comparative non-aqueous inkjet inks COMP-4 to COMP-9 were then prepared according to Table 4 and Table 5 by adding 65 parts by weight of a solvent (the "ink solvent") to 35 parts by weight of the milling mixture during stirring at room temperature. On diluting the milling mixture with water to prepare the comparative non-aqueous inkjet ink COMP-9, a precipitated and inhomogeneous slurry was obtained.

TABLE 4

| wt % of compound: | COMP-4 | COMP-5 | COMP-6 | COMP-7 | COMP-8 | INV-8 |
|---|---|---|---|---|---|---|
| PY150 | 5.25 | 5.25 | 5.25 | 5.25 | 5.25 | 5.25 |
| Solsperse ™ 39000 | 5.25 | 5.25 | 5.25 | 5.25 | 5.25 | 5.25 |
| Dispersion solvent | | | | | | |
| DEGDEE | 24.50 | 24.50 | 24.50 | 24.50 | 24.50 | — |
| PEGDME250 | — | — | — | — | — | 24.50 |
| Ink solvent | | | | | | |
| DEGDEE | 65.00 | — | — | — | — | 65.00 |
| DPGMMEA | — | 65.00 | — | — | — | — |
| TEGMBE | — | — | 65.00 | — | — | — |

TABLE 4-continued

| wt % of compound: | COMP-4 | COMP-5 | COMP-6 | COMP-7 | COMP-8 | INV-8 |
|---|---|---|---|---|---|---|
| PGMPhE | — | — | — | 65.00 | — | — |
| TPGMME | — | — | — | — | 65.00 | — |
| PEGDME250 | — | — | — | — | — | — |
| Water | — | — | — | — | — | — |

TABLE 5

| wt % of compound: | INV-9 | INV-10 | INV-11 | INV-12 | INV-13 | COMP-9 |
|---|---|---|---|---|---|---|
| PY150 | 5.25 | 5.25 | 5.25 | 5.25 | 5.25 | 5.25 |
| Solsperse™ 39000 | 5.25 | 5.25 | 5.25 | 5.25 | 5.25 | 5.25 |
| Dispersion solvent | | | | | | |
| DEGDEE | — | — | — | — | — | — |
| PEGDME250 | 24.50 | 24.50 | 24.50 | 24.50 | 24.50 | 24.50 |
| Ink solvent | | | | | | |
| DEGDEE | — | — | — | — | — | — |
| DPGMMEA | — | 65.00 | — | — | — | — |
| TEGMBE | — | — | 65.00 | — | — | — |
| PGMPhE | — | — | — | 65.00 | — | — |
| TPGMME | — | — | — | — | 65.00 | — |
| PEGDME250 | 65.00 | — | — | — | — | — |
| Water | — | — | — | — | — | 65.00 |

The dispersion stability was evaluated by comparing the average particle size measured after preparation of the ink and the average particle size measured in the ink after a heat treatment of 7 days at 83° C. The results are given in Table 6.

TABLE 6

| Non-aqueous inkjet ink | Average particle size after preparation | after 7 days at 83° C. | % growth |
|---|---|---|---|
| COMP-4 | 127 nm | 1247 nm | 882% |
| COMP-5 | 124 nm | 788 nm | 535% |
| COMP-6 | 111 nm | 613 nm | 452% |
| COMP-7 | 104 nm | 170 nm | 63% |
| COMP-8 | 122 nm | 213 nm | 74% |
| INV-8 | 96 nm | 95 nm | 0% |
| INV-9 | 95 nm | 111 nm | 17% |
| INV-10 | 93 nm | 92 nm | 0% |
| INV-11 | 94 nm | 126 nm | 34% |
| INV-12 | 95 nm | 105 nm | 10% |
| INV-13 | 91 nm | 108 nm | 19% |

In Table 6, it can be seen that the inventive inkjet inks INV-8 to INV-13 using a mixture of polyethyleneglycol dimethylethers (PEGDME250) as the dispersion solvent were much more stable in average particle size than the comparative non-aqueous inkjet inks COMP-4 to COMP-8 having DEGDEE as the dispersion solvent. Hence, a wider choice of ink solvents was available to adjust the ink for viscosity and jetting performance. Moreover, the average pigment particle size in the inventive inkjet inks INV-8 to INV-13 was smaller than in the comparative non-aqueous inkjet inks COMP-4 to COMP-8, which is advantageous for preventing nozzle clogging and for color strength.

Example 3

This example illustrates a CMYK non-aqueous inkjet ink set suitable for producing decorative laminates with a warm wooden color appearance.

Preparation and Evaluation of Inkjet Inks

All non-aqueous inkjet inks were prepared in the same manner to obtain a composition as described in Table 7. If a dispersion synergist was present, the concentration of the dispersion solvent in the milling mixture was compensated for by the function of the dispersion synergist.

A milling mixture with 15 wt % pigment and 15 wt % dispersant was prepared by adding the pigment, the polymeric dispersant Solsperse™ 39000 and, optionally, the dispersant synergist to the dispersion solvent. The milling mixture was then milled during cooling by a NETZSCH™ LABSTAR1 at a 50% volume filling with yttrium-stabilized zirconium oxide-beads of 0.4 mm diameter ("high wear resistant zirconia grinding media" from TOSOH Co.) and a residence time of 45 minutes.

The cyan, magenta and yellow non-aqueous inkjet inks were then prepared by adding 60 parts by weight of DEGMBEA and 5 parts by weight of PEGDME500 to 35 parts by weight of the milling mixture during stirring at room temperature. The black non-aqueous inkjet ink was prepared by adding 57 parts by weight of DEGMBEA and 10 parts by weight of PEGDME500 to 33 parts by weight of the milling mixture during stirring at room temperature.

TABLE 7

| | Non-aqueous CMYK inkjet ink set | | | |
|---|---|---|---|---|
| In wt % of the ink | Cyan ink | Magenta ink | Yellow ink | Black ink |
| PB15 | 5.25 | — | — | — |
| PR254 | — | 5.25 | — | — |
| PY150 | — | — | 5.25 | — |
| PB7 | — | — | — | 5.00 |
| Solsperse™ 39000 | 5.25 | 5.25 | 5.25 | 5.00 |
| Solsperse™ 5000 | 0.35 | — | — | — |
| SYN-1 | — | 0.35 | — | — |
| Dispersion solvent | | | | |
| PEGDME 500 | 24.15 | 24.15 | 24.50 | 23.30 |
| Ink solvent | | | | |
| DEGMBEA | 60.00 | 60.00 | 60.00 | 56.70 |
| PEGDME 500 | 5.00 | 5.00 | 5.00 | 10.00 |

The dispersion synergist SYN-1 was used for preparing the magenta inkjet ink. A suitable synthesis method for the dispersion synergist SYN-1 can be found in EP 1 790 698.

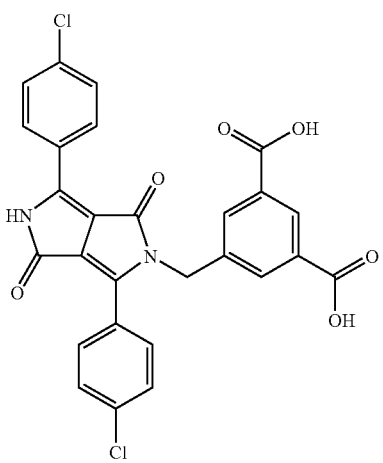

SYN-1

Table 8 shows that the non-aqueous inkjet ink set according to Table 7 exhibited excellent ink characteristics and dispersion stability making it a suitable inkjet ink set for the single pass inkjet printer: DOTRIX™ from AGFA.

TABLE 8

|  | Cyan ink | Magenta ink | Yellow ink | Black ink |
| --- | --- | --- | --- | --- |
| Ink characteristics | | | | |
| Viscosity (mPa · s) (25° C.) | 10.2 | 10.5 | 11.3 | 10.1 |
| surface tension (mN/m) (25° C.) | 31.25 | 31.25 | 31.25 | 31.25 |
| Dispersion stability of inks | | | | |
| Average particle size after preparation | 108 nm | 125 nm | 155 nm | 96 nm |
| Average particle size after 7 days at 83° C. | 107 nm | 123 nm | 155 nm | 97 nm |
| % growth in average particle size | 0% | 0% | 0% | 1% |
| Viscosity after preparation (mPa · s) | 10.2 | 10.5 | 11.3 | 10.1 |
| Viscosity after 7 days at 83° C. (mPa · s) | 10.2 | 10.6 | 10.7 | 10.0 |
| % change in viscosity | 0% | 1% | −5% | −1% |

The excellent pigment dispersion stability is not only demonstrated by the average particle size remaining unchanged after a heat treatment for all four inks, but also by the stable viscosity. A large change in viscosity generally leads to jetting problems and/or deteriorated jetting quality because the creation of an ink droplet by an inkjet print head is largely influenced by ink viscosity.

Each of the inks of the CMYK ink set was degassed prior to jetting with the Agfa: Dotrix™ single pass inkjet printer equipped with Toshiba TEC CB1 printheads. These piezoelectric drop-on-demand printheads are capable of jetting multi-drops within one dot (8 levels) with a minimum of 6 picoliters to maximum 42 picoliters per dot. The standard frequency used was 4.8 KHz/dot (7 drops) and the driving voltage was 22 Volts (ejection orifice diameter=26 micron). The order of printing of the different inks at 300 dpi was first cyan, then magenta, yellow and black.

A series of printing experiments were performed on an uncoated white decorative base paper of 80 g/m² with a Bekk smoothness of 100-200 seconds and containing 32-40% of a titanium dioxide pigment and on two similar decorative base papers coated with an ink-receiving layer.

A first printing experiment was performed on the uncoated decor paper of 80 g/m². The results for the optical density and the L*a*b*-values are given in Table 9.

TABLE 9

| Ink(s) printed on uncoated paper | Optical Density | L* | a* | b* |
| --- | --- | --- | --- | --- |
| None | 0.09 | 96.3 | 0.3 | 3.8 |
| C | 0.70 | 67.6 | −22.0 | −32.9 |
| M | 0.64 | 68.6 | 47.4 | 13.2 |
| Y | 0.60 | 91.5 | −4.4 | 49.3 |
| K | 0.61 | 57.0 | −0.7 | −0.4 |
| Y + M | 0.55 | 71.4 | 39.7 | 20.0 |
| C + Y | 0.61 | 69.9 | −33.2 | 1.3 |
| C + M | 0.62 | 60.7 | −3.6 | −16.2 |
| C + M + K | 0.49 | 64.7 | −9.5 | −1.8 |

A second printing experiment was performed on a coated decor paper ARJOJET from ARJO WIGGINS. The results for the optical density and the L*a*b*-values are given in Table 10.

TABLE 10

| Ink(s) printed on coated paper | Optical Density | L* | a* | b* |
| --- | --- | --- | --- | --- |
| None | 0.08 | 97.0 | 0.8 | 3.9 |
| C | 0.94 | 57.5 | −19.9 | −43.4 |
| M | 0.93 | 61.1 | 60.8 | 29.0 |
| Y | 0.87 | 90.4 | −3.5 | 68.0 |
| K | 0.95 | 40.1 | 0.3 | 0.3 |
| Y + M | 0.97 | 60.0 | 60.0 | 39.0 |
| C + Y | 1.04 | 53.0 | −43.1 | −3.3 |
| C + M | 1.03 | 40.7 | −2.5 | −19.0 |
| C + M + Y | 1.03 | 42.9 | −10.8 | −13.6 |

A third printing experiment was performed on a coated decor paper suitable for inkjet from Technocell Dekor. The results for the optical density and the L*a*b*-values are given in Table 11.

TABLE 11

| Ink(s) printed on coated paper | Optical Density | L* | a* | b* |
| --- | --- | --- | --- | --- |
| None | 0.07 | 98.5 | 0.2 | 4.6 |
| C | 0.85 | 58.0 | −16.1 | −40.0 |
| M | 0.86 | 61.7 | 58.0 | 26.9 |
| Y | 0.87 | 90.8 | −1.4 | 69.6 |
| K | 0.80 | 46.7 | 0.1 | 0.8 |
| Y + M | 1.20 | 59.0 | 59.2 | 48.7 |
| C + Y | 1.04 | 51.2 | −34.9 | 14.1 |
| C + M | 1.06 | 35.3 | 9.2 | −13.6 |
| C + M + Y | 1.11 | 33.8 | −0.7 | −2.2 |

The results in Table 9, Table 10 and Table 11 show that high optical densities were obtained. The highest optical densities were obtained when printing on coated decor paper. The L*a*b*-values illustrate that the desired wide range of color gamut values for the ink set was obtained.

A wood-imitation image and a commercial logo was printed with the single pass inkjet printer: DOTRIX™ from AGFA on the classic decorative base paper substrate ARJO-JET from ARJO WIGGINS. The decorative paper was impregnated with a melamine-formaldehyde resin and integrated into a decorative laminate. A floor made with the decorative laminate had the desired warm color of wood.

The jetting performance of this ink set was further tested by determining the latency time for this ink set in the: Dotrix printer. A latency time of at least 116 hours for all four inks was found, which is considered to be a very long latency time for a solvent based inkjet ink.

Example 4

This example illustrates the effect of the addition of water to the inventive inks in amounts smaller than the comparative non-aqueous inkjet ink COMP-9 of EXAMPLE 2.

Preparation and Evaluation of Inkjet Inks

The inkjet inks in this example were prepared in the same manner as described for EXAMPLE 2.

A series of yellow inks was prepared according to Table 12 having increasing amounts of water.

TABLE 12

| Wt % of compound | Yellow-1 | Yellow-2 | Yellow-3 | Yellow-4 |
|---|---|---|---|---|
| PY150 | 5.25 | 5.25 | 5.25 | 5.25 |
| Solsperse ™ 39000 | 5.25 | 5.25 | 5.25 | 5.25 |
| | Dispersion solvent | | | |
| PEGDME 500 | 24.5 | 24.5 | 24.5 | 24.5 |
| | Ink solvent | | | |
| DEGMBEA | 64.0 | 62.0 | 60.0 | 55.0 |
| water | 1.0 | 3.0 | 5.0 | 10.0 |

A series of cyan inks was prepared according to Table 13 having increasing amounts of water.

TABLE 13

| Wt % of compound | Cyan-1 | Cyan-2 | Cyan-3 | Cyan-4 |
|---|---|---|---|---|
| PB15 | 5.25 | 5.25 | 5.25 | 5.25 |
| Solsperse ™ 39000 | 5.25 | 5.25 | 5.25 | 5.25 |
| Solsperse ™ 5000 | 0.35 | 0.35 | 0.35 | 0.35 |
| | Dispersion solvent | | | |
| PEGDME 500 | 24.15 | 24.15 | 24.15 | 24.15 |
| | Ink solvent | | | |
| DEGMBEA | 64.0 | 62.0 | 60.0 | 55.0 |
| Water | 1.0 | 3.0 | 5.0 | 10.0 |

A series of black inks was prepared according to Table 14 having increasing amounts of water.

TABLE 14

| Wt % of compound | Black-1 | Black-2 | Black-3 | Black-4 |
|---|---|---|---|---|
| PB7 | 5.00 | 5.00 | 5.00 | 5.00 |
| Solsperse ™ 39000 | 5.00 | 5.00 | 5.00 | 5.00 |
| | Dispersion solvent | | | |
| PEGDME 500 | 23.30 | 23.30 | 23.30 | 2330 |
| | Ink solvent | | | |
| DEGMBEA | 60.70 | 58.70 | 56.70 | 51.70 |
| PEGDME 500 | 5.0 | 5.0 | 5.0 | 5.0 |
| Water | 1.0 | 3.0 | 5.0 | 10.0 |

The effect of the amount of water in these inks was evaluated by the effect on the viscosity after preparation and after a heat treatment of 1 week at 83° C. The results are given in Table 15.

TABLE 15

| Inkjet ink | Viscosity after preparation (in mPa · s) | Viscosity after 1 week at 83° C. (in mPa · s) | Jettability |
|---|---|---|---|
| Yellow-1 | 10.7 | 10.2 | OK |
| Yellow-2 | 11.5 | 11.9 | OK |
| Yellow-3 | 87.2 | 29.5 | Not jettable |
| Yellow-4 | 90.3 | 170.1 | Not jettable |
| Cyan-1 | 11.2 | 10.3 | OK |
| Cyan-2 | 11.7 | 11.5 | OK |
| Cyan-3 | 14.0 | 15.5 | Deteriorated |
| Cyan-4 | 16.8 | 17.7 | Deteriorated |
| Black-1 | 10.6 | 10.7 | OK |
| Black-2 | 11.2 | 11.5 | OK |
| Black-3 | 12.1 | 12.7 | OK |
| Black-4 | 11.6 | 16.6 | Deteriorated |

The results in Table 15 show that some water may be present in the non-aqueous inkjet inks of preferred embodiments of the present invention. Increasing the amount of water in these inks give higher and less stable ink viscosities. At a certain amount of water, the viscosity of the ink became too high for jetting the ink using the same jetting conditions. The tolerable amount of water was dependent upon the specific ink. Generally not more than 10 wt % of water based upon the ink can be tolerated as illustrated by the ink Black-4, but it can be lower as can be seen for the yellow inks (3 wt %).

Example 5

This example illustrates that the inkjet inks of preferred embodiments of the present invention with high pigment concentrations exhibit the same excellent dispersion stability as typical inkjet inks with lower pigment concentrations of 1 to 6 wt %. Inkjet inks with high pigment concentrations have been investigated in the past for improving the drying characteristics and the printing speed, but always poor dispersion stability was obtained.

Preparation and Evaluation of Inkjet Inks

The inkjet inks in this example were prepared in the same manner as described for EXAMPLE 2.

A series of yellow inks with higher pigment loads was prepared according to Table 16.

TABLE 16

| Wt % of compound | Yellow-5 | Yellow-6 | Yellow-7 |
|---|---|---|---|
| PY150 | 5.25 | 7.88 | 10.50 |
| Solsperse ™ 39000 | 5.25 | 7.88 | 10.50 |
| | Dispersion solvent | | |
| PEGDME 500 | 24.50 | 36.74 | 49.00 |
| | Ink solvent | | |
| DEGMBEA | 65.00 | 47.50 | 30.00 |

A series of cyan inks with higher pigment loads was prepared according to Table 17.

TABLE 17

| Wt % of compound | Cyan-5 | Cyan-6 | Cyan-7 |
|---|---|---|---|
| PB15 | 5.25 | 7.88 | 10.50 |
| Solsperse ™ 39000 | 5.25 | 7.88 | 10.50 |
| Solsperse ™ 5000 | 0.35 | 0.525 | 0.70 |
| Dispersion solvent | | | |
| PEGDME 500 | 24.15 | 36.215 | 48.30 |
| Ink solvent | | | |
| DEGMBEA | 65.0 | 47.5 | 30.0 |

A series of black inks with higher pigment loads was prepared according to Table 18.

TABLE 18

| Wt % of compound | Black-5 | Black-6 | Black-7 |
|---|---|---|---|
| PB7 | 5.00 | 7.50 | 10.00 |
| Solsperse ™ 39000 | 5.00 | 7.50 | 10.00 |
| Dispersion solvent | | | |
| PEGDME 500 | 23.30 | 35.0 | 46.6 |
| Ink solvent | | | |
| DEGMBEA | 61.7 | 45.0 | 28.4 |
| PEGDME 500 | 5.0 | 5.0 | 5.0 |

The pigment dispersion stability of these inkjet inks was evaluated by measuring the average particle size before and after a heat treatment of 7 days at 83° C. The results are given in Table 19.

TABLE 19

| Non-aqueous inkjet ink | After preparation | After 7 days at 83° C. | % growth |
|---|---|---|---|
| | | Average particle size | |
| Yellow-5 | 99 nm | 90 nm | 0% |
| Yellow-6 | 96 nm | 99 nm | 3% |
| Yellow-7 | 97 nm | 101 nm | 4% |
| Cyan-5 | 112 nm | 112 nm | 0% |
| Cyan-6 | 111 nm | 111 nm | 0% |
| Cyan-7 | 112 nm | 110 nm | 0% |
| Black-5 | 90 nm | 89 nm | 0% |
| Black-6 | 92 nm | 91 nm | 0% |
| Black-7 | 89 nm | 90 nm | 1% |

From Table 19 it can be seen that the average particle size after a heat treatment remains practically unchanged even for inks having pigment concentrations higher than 10 wt % based upon the total ink. These highly concentrated solvent inkjet inks have the advantage that reduced amounts of solvent are jetted onto the substrates, which solvents need to be absorbed and/or evaporated.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A non-aqueous inkjet ink comprising:
   a pigment; and
   a mixture of at least two polyalkyleneglycol dialkylethers represented by Formula (I):

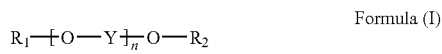

Formula (I)

wherein;
   $R_1$ and $R_2$ are each independently selected from an alkyl group having 1 to 4 carbon atoms;
   Y represents an ethylene group or a propylene group;
   n is an integer selected from 4 to 20 for a first polyalkyleneglycol dialkylether; and n is an integer selected from 5 to 20 for a second polyalkyleneglycol dialkylether.

2. The non-aqueous inkjet ink according to claim 1, wherein the mixture includes a third polyalkyleneglycol dialkylether according to Formula (I) having the integer n selected from 4 to 20.

3. The non-aqueous inkjet ink according to claim 2, wherein the third polyalkyleneglycol dialkylether has the integer n selected from 6 to 20.

4. The non-aqueous inkjet ink according to claim 1, wherein the polyalkyleneglycol dialkylethers are polyethyleneglycol dialkylethers.

5. The non-aqueous inkjet ink according to claim 1, wherein $R_1$ and $R_2$ represent methyl and/or ethyl.

6. The non-aqueous inkjet ink according to claim 1, wherein the mixture of polyalkyleneglycol dialkylethers represented by Formula (I) includes at least one polyalkyleneglycol dialkyl ether wherein the integer n is equal to 6.

7. The non-aqueous inkjet ink according to claim 1, further comprising a polyalkyleneglycol derivative selected from the group consisting of polyalkyleneglycol monoalkyl ether acetates and polyalkyleneglycol monoalkyl ethers.

8. The non-aqueous inkjet ink according to claim 7, wherein the polyalkyleneglycol monoalkyl ether acetate is selected from the group consisting of dipropyleneglycol monomethyl ether acetate and diethyleneglycol monobutyl ether acetate.

9. The non-aqueous inkjet ink according to claim 7, wherein the polyalkyleneglycol monoalkyl ether is selected from the group consisting of triethyleneglycol monobutyl ether and tripropyleneglycol monomethylether.

10. The non-aqueous inkjet ink according to claim 7, wherein the liquid component of the ink consists of one or more polyalkyleneglycol derivatives and the mixture of polyalkyleneglycol dialkylethers.

11. The non-aqueous inkjet ink according to claim 1, further comprising a dispersion synergist.

12. The non-aqueous inkjet ink according to claim 1, wherein the ink has a pigment concentration between 6 wt % and 15 wt % based upon the total weight of the ink.

13. The non-aqueous inkjet ink according to claim 1, wherein the non-aqueous inkjet ink is a radiation curable inkjet ink.

14. An inkjet ink set comprising:
   at least two non-aqueous inkjet inks according to claim 1.

15. The inkjet ink set according to claim 14, further comprising a non-aqueous inkjet ink including a diketopyrrolopyrrole pigment.

16. The inkjet ink set according to claim 15, wherein the diketopyrrolo-pyrrole pigments are C.I. Pigment Red 254.

17. A method for preparing a non-aqueous inkjet ink comprising the steps of:
   a) preparing a pigment dispersion by mixing a pigment and a solvent mixture including at least two polyalkyleneglycol dialkylethers represented by Formula (I):

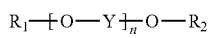

Formula (I)

wherein;
   $R_1$ and $R_2$ are each independently selected from an alkyl group having 1 to 4 carbon atoms;
   Y represents an ethylene group or a propylene group;
   n is an integer selected from 4 to 20;
   n is a different integer for the at least two polyalkyleneglycol dialkylethers; and
   b) diluting the pigment dispersion of step a) with a non-aqueous solvent to obtain a pigment concentration between 0.1 wt % and 20 wt % based upon the total weight of the inkjet ink.

* * * * *